United States Patent [19]

Harrison, deceased et al.

[11] 4,264,140
[45] Apr. 28, 1981

[54] LOW REFLECTION COATINGS FOR WINDOWS

[75] Inventors: Henry Harrison, deceased, late of Locust Valley, N.Y., by Dorothy D. Harrison, administratrix; Henry C. Harrison, Locust Valley, N.Y.

[73] Assignee: Halm Instrument Co., Inc., Glen Head, N.Y.

[21] Appl. No.: 892,426

[22] Filed: Mar. 31, 1978

Related U.S. Application Data

[63] Continuation-in-part of Ser. No. 768,146, Feb. 14, 1977, abandoned.

[51] Int. Cl.³ ............................................... G02B 1/10
[52] U.S. Cl. ................................. 350/276 R; 350/261; 428/441
[58] Field of Search ............ 350/276 R, 175 NG, 164, 350/258, 259, 261; 428/333, 336, 429, 446, 447

[56] References Cited

U.S. PATENT DOCUMENTS

| | | | |
|---|---|---|---|
| 2,557,778 | 6/1951 | Barry | 428/447 |
| 2,834,689 | 5/1958 | Jupnik | 428/333 |
| 3,312,574 | 4/1967 | Laur | 428/447 |
| 3,630,809 | 12/1971 | Edwards | 428/336 |

*Primary Examiner*—Jon W. Henry
*Attorney, Agent, or Firm*—James P. Malone

[57] ABSTRACT

A low reflection coating for windows. A coating of silicone rubber is applied on one surface of the window and preferably also on the other surface. Each coating preferably has a thickness of several wavelengths of light and has a minimum thickness of two microns. The coating is low cost and is suitable for large areas, for instance solar heat collectors. Reflectivity is reduced by approximately one-third. The coating has no relation to a quarter wavelength or any multiple thereof of incident light.

2 Claims, 1 Drawing Figure

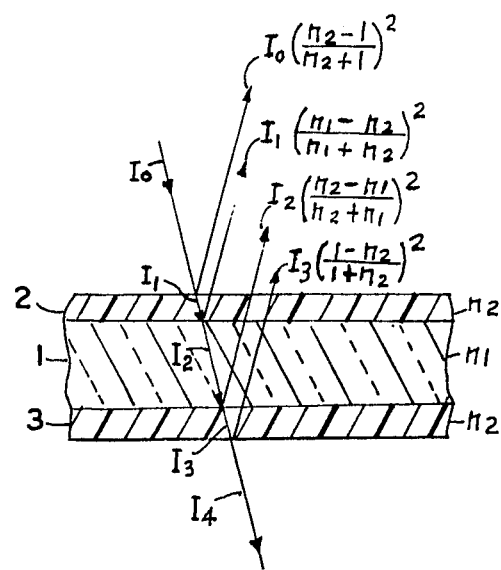

LOW REFLECTION COATINGS FOR WINDOWS

This application is a Continuation-in-part of prior co-pending application, Ser. No. 768,146, filed Feb. 14, 1977, having the same title and now abandoned.

This invention relates to low reflection coatings for windows and more particularly to low cost coatings suitable for solar collectors.

In a solar collector, it is frequently necessary to provide a transparent window which protects the collector from weathering and reduces heat losses to the outside atmosphere. Although the light absorption of such a window is generally quite small, reflection causes a significant reduction of transmitted light. Glass windows, for example, reflect about nine percent of the light falling on them perpendicular to the surface, and more at smaller angles. It is well known that the reflectivity is proportional to the square of the ratio of the indices of reflection of glass and air. Thus, materials of lower index of refraction exhibit lower reflectivity. However, they also have generally higher cost and poorer mechanical properties.

The present invention combines a transparent coating of low index material on a transparent substrate of high index material, to obtain lower reflectivity while at the same time retaining the strength and rigidity of the substrate. The coating will be effective if it is thicker than several wavelengths of light. I have found, for example, that a coating of clear silicone rubber on glass reduces the reflectivity by about thirty-two percent. Since the index of the coating is still not very greatly different from the index of the substrate, the reflectivity at the coating-substrate surface is relatively small, about 1/15 of the total reflectivity.

Coating systems where quarter wavelength layers of high index transparent material are vacuum deposited to reduce reflection to as low as one-fifth are known in lens construction and other refined optical devices, but the cruder and much less expensive coatings contemplated here, which have a maximum reflectivity reduction of one-half seem to have been overlooked.

This new coating system is especially advantageous when two or more transparent glazings are employed in a solar collector, since light losses will be reduced one and one-half percent at each coated surface, with a corresponding increase in overall efficiency of the collector.

Accordingly, a principal object of the invention is to provide new and improved low reflection coatings for windows.

Another object of the invention is to provide new and improved low-reflection coatings for windows which do not require precisely controlled materials, precisely controlled application methods or precisely controlled thickness of coating.

Another object of the invention is to provide a new and improved low-reflection coating for windows which combines the advantageous reflection properties of low index of refraction materials with the advantageous mechanical properties of the window substrate material.

Another object of the invention is to provide a new and improved low-reflection coating for windows which can be fabricated at a cost less than the value of the additional sunlight transmitted by the window.

Another object of the invention is to provide a thin transparent, low index silicone rubber coating for windows of solar flat plate collectors, whereby the light-collecting efficiency of such collectors is improved.

Another object of the invention is to provide new and improved low reflection coatings for windows with a coating of silicone rubber having a thickness one or more wavelengths of light.

Another object of the invention is to provide a new and improved low reflection coating for a window comprising a coating on both surfaces of the window.

Another object of the invention is to provide low cost coatings for large areas such as in solar collectors.

These and other objects of the invention will be apparent from the following Specification and drawing.

The drawing illustrates the effect of reflections of light at the interfaces where the window pane 1, which may be of glass, has a first outer coating 2, of silicone rubber, and a second inner coating 3 of silicone rubber. Each coating has a thickness of several wavelengths of light and may be of the order of 0.0003 inches thick.

0.0003 inches is approximately 7.6 microns. This contrasts with a quarter wavelength of visible light which is approximately 0.14 microns. Therefore, the present coatings have no relation to the quarter wavelength of incident light. The coatings herein are preferably a minimum of 2 microns thick.

The present coatings are more than a quarter wavelength of incident light in the solar heating range and are unequal to and have no relation to any whole multiple of a quarter wavelength of said incident light.

In the illustration, a beam of light of intensity $I_o$ strikes the window approximately perpendicular to the surface. A portion is reflected at each interface. According to Fresnel's law, a well known law of optics, the reflected intensity is given by $$I\left(\frac{\tan(i-r)}{\tan(i+r)}\right)^2$$

where i is the angle of incidence of the beam and r is the angle of refraction and I is the intensity of light incident at the interface. For beams which are approximately perpendicular to the interface, the reflected intensity can be approximated, as it has been in the illustration by $$I\left(\frac{n_r - n_i}{n_r + n_i}\right)^2.$$

Since, for practical examples, the reflection at an interface is only a few percent, the incident intensity $I_1$, $I_2$, $I_3$ at any interface, which is reduced by back reflections at preceding interfaces, and augmented by forward re-reflections at preceding interfaces, is still approximately equal to the intensity $I_o$.

Reflections of incident light beams at angles other than perpendicular are somewhat greater, but are still commonly less than ten percent up to angles of 60° from perpendicular. The law of dependence of reflectance on index of refraction remains substantially independent of angle of incidence in this range, so we may use the simple model of the illustration to approximate the effect a low index coating has on reflection loss from beams of light incident from any direction.

If $n_1 = 1.57$, $n_2 = 1.43$, typical of glass and silicone rubber, $$I_4 \simeq I_o\left(1 - \frac{(n_2-1)^2}{(n_2+1)^2} - \left(\frac{n_1-n_2}{n_1+n_2}\right)^2 - \left(\frac{n_2-n_1}{n_2+n_1}\right)^2 - \left(\frac{(1-n_2)}{(n_2+1)}\right)^2\right) = (1 - .0670)I_o$$

If the coating is omitted:

$$I_4' \simeq I_o\left(1 - \left(\frac{n_1-1}{n_1+1}\right)^2 - \left(\frac{1-n_1}{1+n_1}\right)^2\right) = (1 - .0984)I_o$$

In solar collectors each square foot of collector is costing about five dollars. Thus, each one percent improvement in efficiency is worth about five cents per square foot. In a collector having two glass covers, our silicone rubber coating eliminates about six percent of reflection loss, saving about thirty cents per square foot, of collector. This coating costs only a few cents per square foot and can be applied with a spray, a dip, a brush, or a roller at very low cost. By contrast, a fraction of a wavelength controlled thickness and controlled index coating, such as is disclosed in the prior art, would cost several dollars per square foot, and could only be applied by elaborate and costly special coating equipment.

A coating such as we have made is far less efficient within a limited wavelength region, than for example the coating of U.S. Pat. No. 3,761,160, which reduces reflectance by a factor of 10, and our coating cannot produce surfaces figured to optical precision. It is, however, very practical and cost-effective for solar collectors.

Silicone rubber has a fairly low index of refraction and adequate transparency. It withstands weathering and adheres well enough to glass.

Other transparent materials having a low index of refraction are known. For example, fluorine ethylene propylene (FEP) has a refractive index as low as 1.34, leading to a transmitted intensity of about $(1-0.0547)I_o$.

As the difference in indices between the substrate and the coating gets greater, the reflective loss at the interface gets greater. Thus there is some advantage in adding an intermediate coating having an intermediate index of refraction. The improvement which can be gained by adding m intermediate coatings of suitable index of refraction is approximately $$2\left(\frac{m}{m+1}\right)\left(\frac{n_1-n_2}{n_1+n_2}\right)^2.$$

Thus, for example, a single intermediate coating, between FEP and glass, could save about 0.6% of the incident radiation. This might be worthwhile in a double-glazed solar collector if it could be done for less than three quarters of a cent per square foot of coated surface. In our silicone coating example, the savings obtained from an intermediate layer would be only slightly more than 0.2%.

Thus, we are aware that single or multiple coatings of other low index materials may be used to reduce reflective losses from a solar collector window, and therefore, although we prefer silicone rubber, as a practical durable moderate cost, easily applied material, we do not wish to be limited except by the claims.

The prior art discloses various other coatings, for instance:

U.S. Pat. No. 3,781,089, discloses alternate layers of metal alloy and silicone monoxide.

U.S. Pat. No. 3,449,463, discloses metal oxide coatings.

U.S. Pat. No. 3,883,214, discloses alkali-metal halide coatings.

All of these prior art patents disclose expensive materials and/or processes. These are not suitable for solar collectors when low cost is required for the large areas involved.

It is claimed:

1. A low reflection coating for a glass window pane comprising:
    a first thin film coating of transparent silicone rubber several wavelengths of visible light thick applied to one side of the window pane,
    and a second thin film coating of transparent silicone rubber several wavelengths of visible light thick applied to the other side of the window pane,
    the coatings having an index of refraction lower than the index of refraction of the window pane.

2. Apparatus as in claim 1, wherein the coating thickness is more than a quarter wavelength of incident light and unequal to any whole multiple of a quarter wavelength of incident light.

* * * * *